US012276416B1

(12) United States Patent
Hu

(10) Patent No.: US 12,276,416 B1
(45) Date of Patent: Apr. 15, 2025

(54) WATERPROOF LAMP STRUCTURE

(71) Applicant: Xiaoyan Hu, Yangjiang (CN)

(72) Inventor: Xiaoyan Hu, Yangjiang (CN)

( * ) Notice: Subject to any disclaimer, the term of this patent is extended or adjusted under 35 U.S.C. 154(b) by 0 days.

(21) Appl. No.: 18/922,747

(22) Filed: Oct. 22, 2024

(51) Int. Cl.
*F21V 31/00* (2006.01)
*F21V 5/04* (2006.01)
*F21V 23/00* (2015.01)
*F21S 4/10* (2016.01)

(52) U.S. Cl.
CPC .............. *F21V 31/005* (2013.01); *F21V 5/04* (2013.01); *F21V 23/002* (2013.01); *F21S 4/10* (2016.01)

(58) Field of Classification Search
CPC ........ F21V 31/005; F21V 5/04; F21V 23/002; F21S 4/10
See application file for complete search history.

(56) References Cited

U.S. PATENT DOCUMENTS 9,097,417 B1 * 8/2015 Kwon ........................ F21L 2/00
2008/0186731 A1 * 8/2008 Graham .................... F21S 4/28 362/555
2011/0194292 A1 * 8/2011 Tsai ........................... F21S 4/10 362/231
2017/0206813 A1 * 7/2017 Huang ...................... F21V 5/04
2020/0041115 A1 * 2/2020 Kim ...................... F21V 19/003

* cited by examiner

*Primary Examiner* — Tracie Y Green
*Assistant Examiner* — Michael Chiang
(74) *Attorney, Agent, or Firm* — Birchwood IP

(57) ABSTRACT

A waterproof lamp structure is provided, which includes an upper shell, a lower shell, and a wire. The upper shell and the lower shell form an accommodation cavity, which is provided with a PCB lamp board; two sides of the accommodation cavity are provided with a notch and an installation part. The installation part is provided with a transverse elastic strip. The wire passes through the notch along the installation part, is electrically connected to the PCB lamp board, and abuts against the transverse elastic strip. When the wire passes through the notch and is electrically connected to the PCB lamp board, it will undergo compression deformation with the transverse elastic strip. An elasticity of the elastic strip and a compression of the wire are used to form a tight waterproof seal, preventing moisture from infiltrating into an interior from a connection between the wire and the shell.

7 Claims, 4 Drawing Sheets

WATERPROOF LAMP STRUCTURE

TECHNICAL FIELD

The present disclosure relates to the field of waterproof lamp technologies, and in particular, to a waterproof lamp structure.

BACKGROUND

The waterproof lamps with wires on the existing market do not have waterproof function at connections of the wires, which can easily cause water leakage and have a low waterproof level, failing to meet an actual usage requirement of a product.

SUMMARY

The purpose of the present disclosure is to overcome the shortcomings of existing technology and provide a waterproof lamp structure.

In order to solve the above technical problems, the present disclosure adopts the following technical solution.

An embodiment of the present disclosure provides a waterproof lamp structure, including an upper shell, a lower shell, and a wire; the upper shell and the lower shell form an accommodation cavity, which is provided with a PCB lamp board; two sides of the accommodation cavity are provided with a notch and an installation part extending outward; the installation part is provided with two transverse elastic strips; the wire passes through the notch along the installation part and is electrically connected to the PCB lamp board, and the wire abuts against the two transverse elastic strips.

In a specific embodiment, the two transverse elastic strips are arranged in a wave shape on the installation part.

In a specific embodiment, the two transverse elastic strips are circular, triangular, or diamond shaped.

In a specific embodiment, heights of the two transverse elastic strips are 0.05 mm-0.3 mm.

In a specific embodiment, the two transverse elastic strips are integrally formed with the installation part.

In a specific embodiment, both the upper shell and the lower shell are provided with the notch and the installation part.

In a specific embodiment, the upper shell is further provided with a lens.

In a specific embodiment, the lens is hemispherical.

In a specific embodiment, the lens is convex or concave hemispherical.

In a specific embodiment, the lens is integrally formed with the upper shell.

The waterproof lamp structure of the present disclosure has the beneficial effect compared with the prior art that: by providing the notch on two sides of the accommodation cavity, and providing with the installation part and the two transverse elastic strips, when the wire passes through the notch and is electrically connected to the PCB lamp board, it will undergo compression deformation with the two transverse elastic strips. This design can utilize the elasticity of the two elastic strips and a compression of the wire to form a tight waterproof seal, preventing moisture from infiltrating into an interior from a connection between the wire and the shell, thereby significantly improving the waterproof level of the lamp and having strong practicality.

The present disclosure will be further described in combination with the accompanying drawings and specific embodiments.

BRIEF DESCRIPTION OF DRAWINGS

In order to provide a clearer explanation of the technical solution in the embodiments of the present disclosure, a brief introduction will be given to the drawings required for the embodiments or descriptions of the prior art. It is obvious that the drawings described below are only some embodiments of the present disclosure. For those skilled in the art, other drawings can be obtained based on these drawings without creative work.

DESCRIPTION OF EMBODIMENTS

Figure 1:
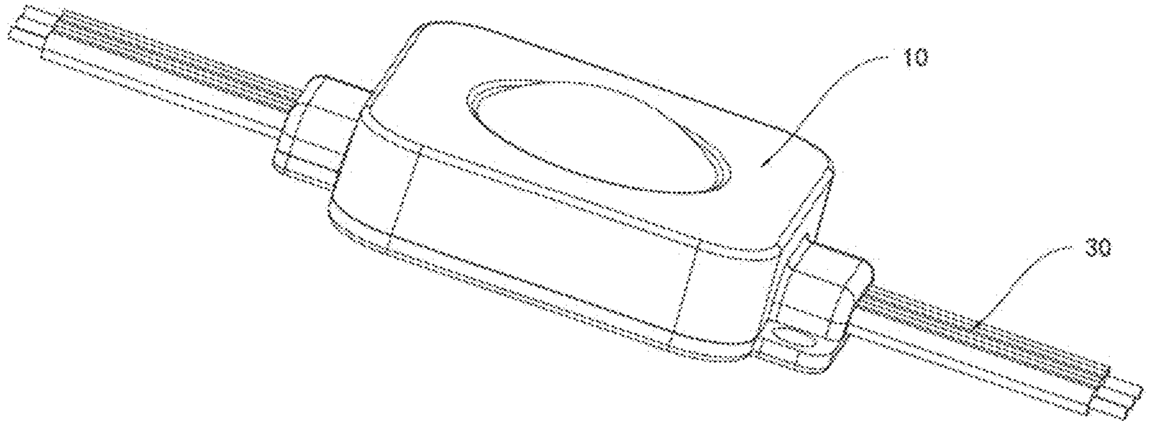
FIG. 1 is a three-dimensional schematic diagram of a waterproof lamp structure provided by the present disclosure.
Figure 2:
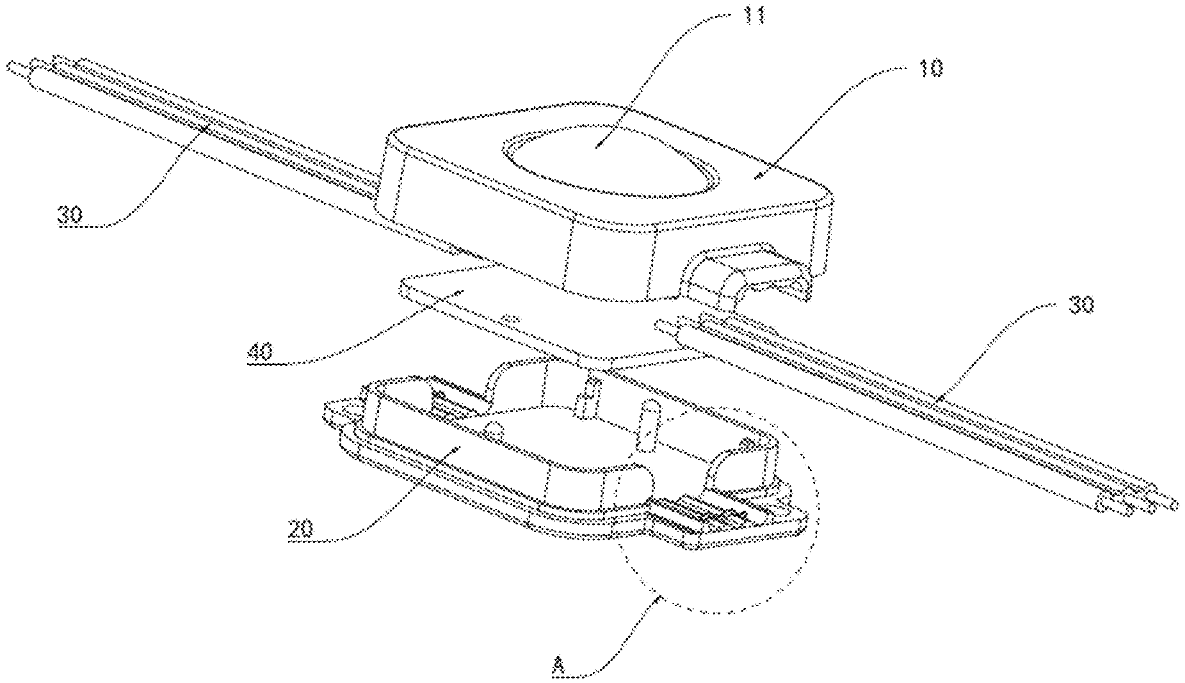
FIG. 2 is an exploded schematic diagram of the waterproof lamp structure provided by the present disclosure.
Figure 3:
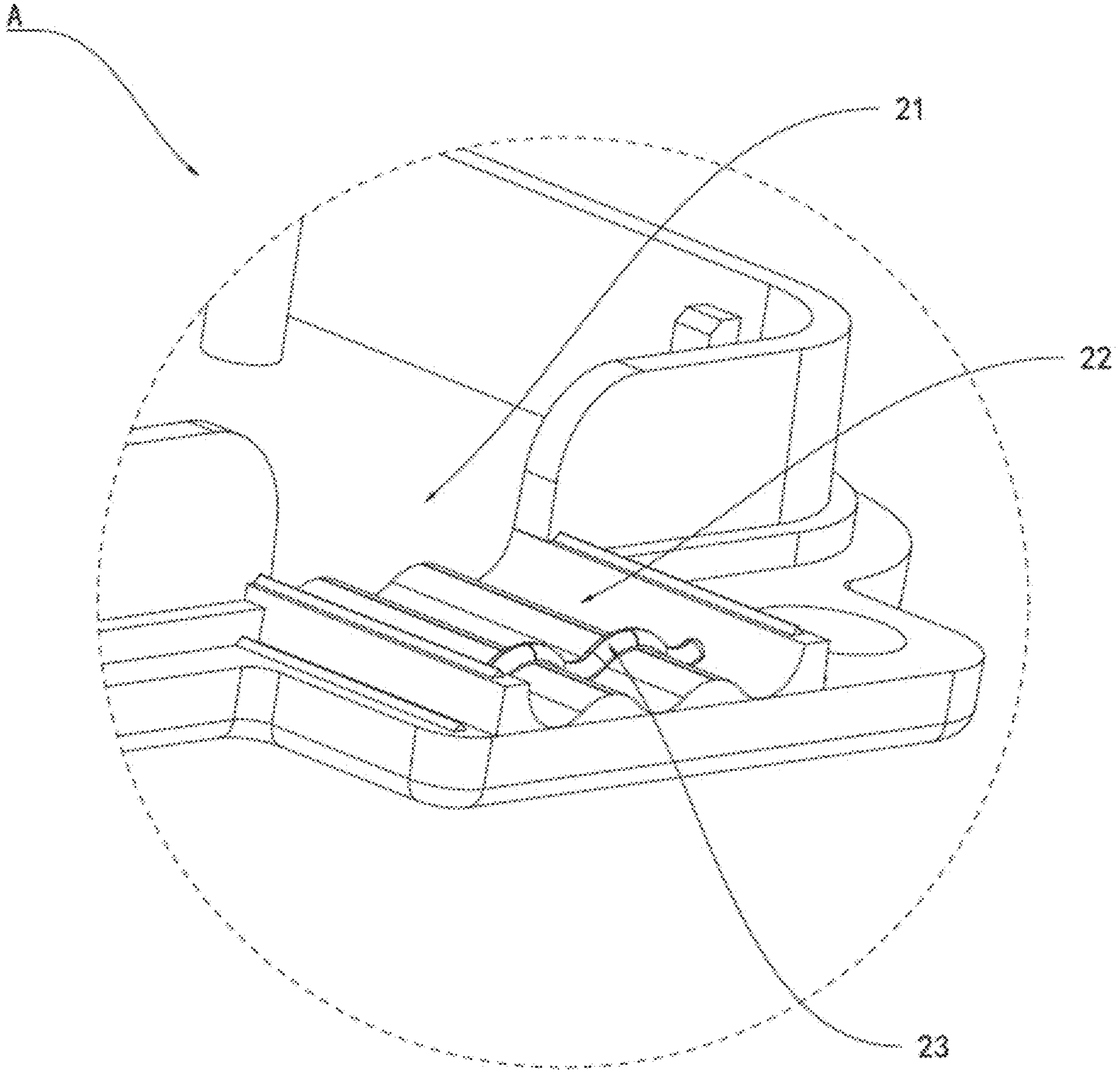
FIG. 3 is a partially enlarged schematic diagram of part Ain FIG. 2.

In order to clarify the purpose, technical solution, and advantages of the present disclosure, further detailed explanations will be provided below in combination with the accompanying drawings and specific implementation modes.

Referring to the specific embodiments shown in FIGS. 1 to 5, the present disclosure discloses a waterproof lamp structure, which includes an upper shell 10, a lower shell 20, and a wire 30. The upper shell 10 and the lower shell 20 form an accommodation cavity, which is provided with a PCB lamp board 40; two sides of the accommodation cavity are provided with a notch 21 and an installation part 22 extending outward. The installation part 22 is provided with two transverse elastic strips 23. The wire 30 passes through the notch 21 along the installation part 22 and is electrically connected to the PCB lamp board 40, and the wire 30 abuts against the two transverse elastic strips 23.

In an implementation mode, by providing the notch 21 on two sides of the accommodation cavity and providing with the installation part 22 and the two transverse elastic strips 23, when the wire 30 passes through the notch 21 and is electrically connected to the PCB lamp board 40, it will undergo compression deformation with the two transverse elastic strips 23. This design can utilize the elasticity of the two elastic strips and a compression of the wire 30 to form a tight waterproof seal, thereby preventing moisture from seeping into an interior from a connection between the wire 30 and the shell, thereby significantly improving the waterproof level of the lamp and having strong practicality. In an implementation mode, by forming the accommodation cavity between the upper shell 10 and the lower shell 20, internal electronic components such as the PCB lamp board 40 can be effectively protected from harmful substances such as external moisture and dust, which is crucial for ensuring a stable operation and extending a service life of the lamp. In addition, due to an excellent waterproof performance of the waterproof lamp structure, it can be applied to various harsh environments such as humidity and high water. This not only expands an application range of the lamp, but also improves its reliability and durability, enabling the lamp to maintain stable lighting effects in various environments.

In an embodiment, the two transverse elastic strips 23 are provided in a wave shape on the installation part 22.

In an implementation mode, setting directions of the two transverse elastic strips 23 and a setting direction of the wire 30 are arranged in a cross shape. The wavy design increases a contact area between the two transverse elastic strips 23 and the wire 30 compared to a flat design. This increase not only enhances physical contact, but also achieves a tight fit between the wire 30 and the two elastic strips at multiple points through an undulating shape of the wave. This tight contact helps to reduce a gap between the wire 30 and the two elastic strips, thereby improving an overall connection stability and firmness. In addition, the design of the wavy transverse elastic strips 23 also enhances its fixing effect on the wire 30. Due to the presence of the wave shape, when the wire 30 is placed on the elastic strips, it will be subjected to multiple squeezing forces from peaks and valleys of the waves, which helps to firmly fix the wire 30 on the elastic strips; at the same time, the wavy design further enhances an anti-slip ability of the wire 30 on the elastic strips, rendering it less likely for the wire 30 to slip or shift off the elastic strips even when subjected to an external force. In addition, the wavy transverse elastic strips 23 can optimize a stress distribution between the wire 30 and the two elastic strips. When subjected to stress, the wavy elastic strips can more effectively disperse stress and avoid damage caused by stress concentration. This ability to disperse stress not only improves a load-bearing capacity of the entire structure, but also extends the service life of the elastic strips and wire 30. Furthermore, the wavy design also increases an elastic deformation ability of the elastic strips, enabling it to better adapt to a slight deformation of the wire 30 under stress, thereby further enhancing durability.

In an embodiment, the two transverse elastic strips 23 are circular, triangular, or diamond shaped.

Specifically, the circular, triangular, or diamond shaped transverse elastic strips 23, due to its unique geometric shape, it can better adhere tightly to a surface of the wire 30. This tight fit helps to reduce the gap between the wire 30 and the elastic strips, thereby improving the overall sealing performance. And these shaped elastic strips usually have good elastic deformation ability, which can undergo a moderate deformation when subjected to an external force, thus better adapting to the shape and size changes of the wire 30. This deformation ability helps to maintain a continuous tight contact between the wire 30 and the elastic strips, further enhancing the sealing effect. In addition, the circular, triangular, or diamond shaped transverse elastic strips 23, due to its irregularity in shape, which can increase a frictional force of the wire 30 on the elastic strips, thereby improving an anti-slip ability of the wire 30. This anti-slip ability helps ensure that the wire 30 will not fall off or shift due to the external force during long-term use. In an implementation mode, the transverse elastic strips 23 are circular in shape.

In an embodiment, heights of the transverse elastic strips 23 are 0.05 mm-0.3 mm.

Specifically, the heights of the transverse elastic strips 23 are within a range of 0.05 mm-0.3 mm, which ensures a tight contact between it and the wire 30. This tight contact helps reduce the gap between the wire 30 and the elastic strips, preventing moisture or other harmful substances from penetrating into the interior of the waterproof lamp structure through the gap. Therefore, the design of this height is crucial for maintaining the sealing performance of the waterproof lamp structure. In addition, within the height range of 0.05 mm-0.3 mm, the transverse elastic strips 23 can maintain good elastic deformation ability. This means that when the wire 30 is placed on the elastic strips, the elastic strips can undergo moderate deformations so as to adapt to the shape and size of the wire 30. This deformation ability not only helps to maintain a close contact between the wire 30 and the elastic strips, but also disperses stress when subject to stress, avoiding damage caused by stress concentration. In addition, the height range of 0.05 mm-0.3 mm renders the transverse elastic strips 23 to adapt to the wires 30 with different specifications. This means that when designing and manufacturing the waterproof lamp structure, different heights of elastic strips can be selected to meet needs of different wires 30. This flexibility helps reduce a production cost and improve production efficiency.

In an embodiment, the two transverse elastic strips 23 are integrally formed the installation part 22.

Specifically, the design of the integrated structure ensures that there are no joint gap or connector between the two transverse elastic strips 23 and the installation part 22. This seamless connection not only improves a strength of the entire structure, but also enhances its stability; when subjected to stress, the integrated structure can better disperse stress and avoid damage caused by stress concentration, thereby extending the service life of the waterproof lamp structure. In addition, as the transverse elastic strips 23 are integrally formed with the installation part 22, their bonding is tighter, without gaps caused by poor bonding. This tight bonding helps to reduce the infiltration of moisture or other harmful substances, and improves the sealing performance of the waterproof lamp structure. In humid or harsh environments, this sealing performance is particularly important to ensure the normal operation and service life of the waterproof lamp structure.

Figure 4:
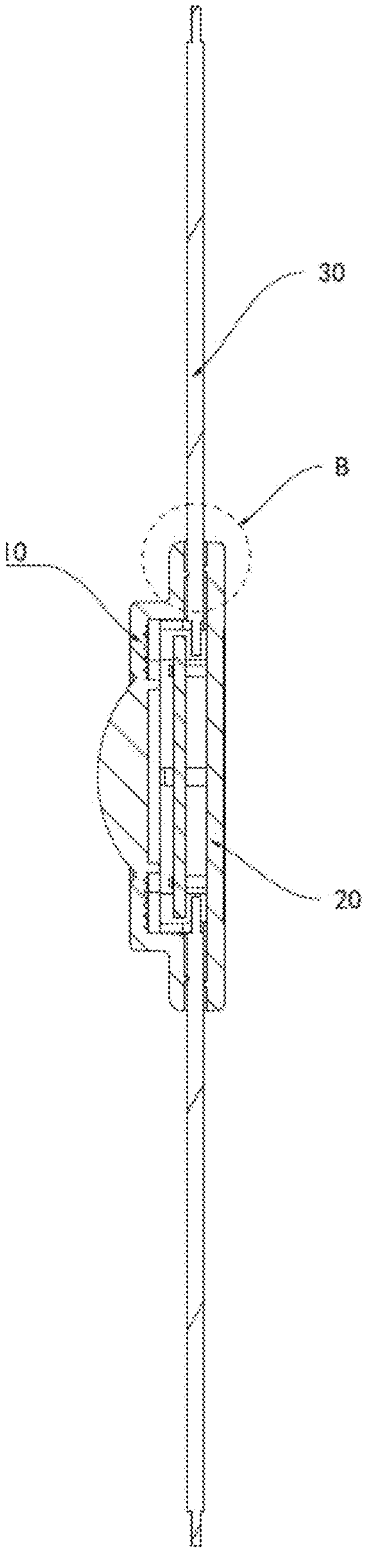
FIG. 4 is a schematic sectional view of the waterproof lamp structure provided by the present disclosure.
Figure 5:
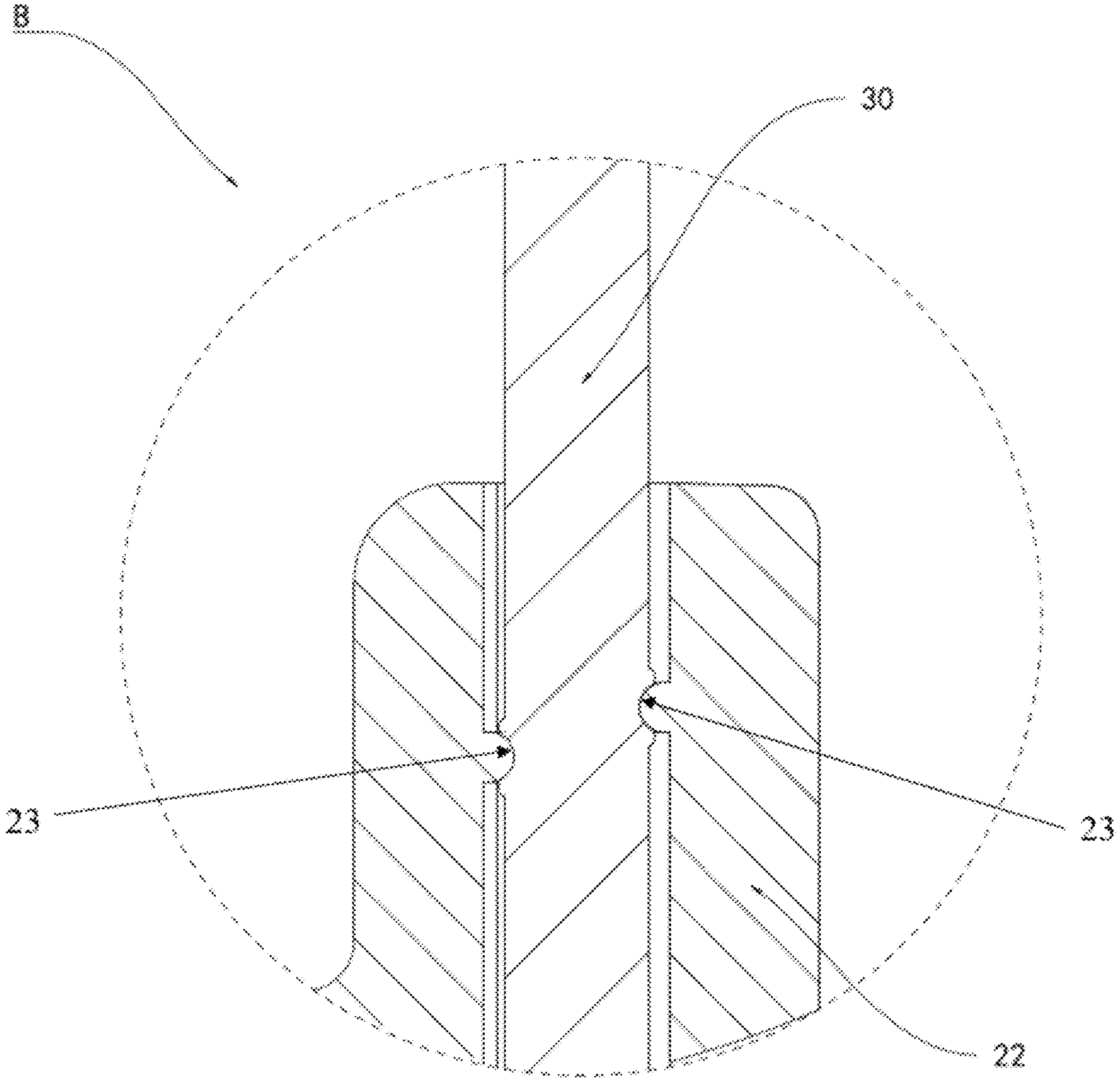
FIG. 5 is a partially enlarged schematic diagram of part B in FIG. 4.

In an embodiment, as shown in FIGS. 4 and 5, both the upper shell 10 and the lower shell 20 are provided with the notch 21 and installation part 22.

Specifically, by providing with the notch 21 and the installation part 22 on both the upper shell 10 and the lower shell 20, the wire 30 can be in close contact with the two transverse elastic strips 23 at two ends. This dual end contact way can more effectively compress an outer skin of the wire 30, causing it to deform and tightly adhere to the elastic strips. This tight fit helps to reduce the gap between the wire 30 and the shell, preventing moisture or other harmful substances from penetrating into the waterproof structure through the gap, thereby significantly improving the waterproof sealing effect. In addition, due to the compression and fixation of the wire 30 by the two transverse elastic strips 23 at two ends, this technology can enhance a reliability of the waterproof structure. Even if the wire 30 undergoes a slight deformation due to force or temperature changes during long-term use, the presence of dual end fixation can maintain a close contact between it and the elastic strips, thereby ensuring the continuous stability of waterproof performance. In addition, due to the compression and fixation of the wire 30 by the transverse elastic strips 23 at two ends, this technology can reduce the looseness and wear of the wire 30 during long-term use. This effect of reducing looseness and wear helps to improve the durability of the waterproof structure and extend its service life.

In an embodiment, the upper shell 10 is further provided with a lens 11.

Specifically, the PCB lamp board 40 adopts existing publicly available technology, which will not be further elaborated here. Where, lens 11 can accurately control the direction and angle of light propagation, ensuring that the light is emitted along a predetermined path. This control effect enables the light to be more concentrated and efficiently directed towards a target area, thereby improving an efficiency of light emission. In addition, by designing the shape and size of the lens 11 reasonably, the diffusion angle and range of the light can be adjusted. This adjustment effect allows the light to illuminate a wider area, thereby expanding an illumination range. In scenes that require large-area illumination, this effect of the lens 11 can significantly improve an illumination effect.

In an embodiment, the lens 11 is hemispherical.

Specifically, the hemispherical lens 11 can focus light parallel to a centerline of the lens 11 onto a point called a focal point, which is known as a focusing effect of the lens 11. By utilizing this effect, the hemispherical lens 11 can amplify the light, allowing it to be more concentrated and shine on a target area after passing through the lens 11, thereby enhancing brightness and illumination effect of the light. In addition, when light passes through the hemispherical lens 11, due to different refractive indices of the lens 11 and a surrounding medium, the light will undergo refraction. By designing the shape and size of the lens 11 reasonably, the refraction angle and direction of the light can be controlled, so that the light can propagate along a predetermined path. This direction control is particularly important in lighting equipment, which can ensure that the light can accurately illuminate the area that needs to be illuminated.

In an embodiment, the lens 11 is convex or concave hemispherical.

Specifically, the convex hemisphere is used for focusing, and the concave hemisphere is used for astigmatism. Where the convex hemispherical lens 11 has characteristic of focusing parallel light rays at a point. When the light rays pass through the convex hemispherical lens 11, they will be focused and refracted towards a center point of the lens 11, and form a clear focus on the other side of the lens 11. This characteristic makes the convex hemispherical lens 11 very useful in scenes that require high-intensity, small-area illumination. In addition, due to an ability of the convex hemispherical lens 11 to focus light on a single point, a utilization rate of light can be significantly improved. In situations where the light source intensity is limited, the convex hemispherical lens 11 can be used to ensure that more light is effectively utilized for illumination. Where, in contrast to the convex hemispherical lens 11, the concave hemispherical lens 11 has characteristic of diverging light rays. When light passes through the concave hemispherical lens 11, it refracts towards an edge of the lens 11 and forms divergent light rays, this characteristic makes the concave hemispherical lens 11 very useful in scenes that require large-area, low-intensity illumination. In addition, an astigmatism effect of the concave hemispherical lens 11 can expand the illumination range, allowing light to be more evenly distributed throughout the entire illumination area. This characteristic is particularly important in scenes that require large-area illumination, such as home lighting, office lighting, etc.

In an embodiment, the lens 11 is integrally formed with the upper shell 10.

Specifically, when the lens 11 is integrally formed with the upper shell 10, their connection will be more firm and stable. This structural form can effectively reduce looseness or damage caused by long-term use or external environmental factors (such as vibration, impact, etc.), thereby improving the structural strength and stability of the entire product. In addition, the integrated molding structure helps to reduce the gap and air layer between the lens 11 and the upper shell 10, thereby reducing the refraction and reflection losses of light during propagation. This optimization can improve the transmittance and utilization of light, rendering the product have better optical performance. In addition, the integrated molding structure of the lens 11 and the upper shell 10 can simplify the production process, reduce assembly procedures and costs. During a manufacturing process, the materials of the lens 11 and the upper shell 10 can be directly fused or injection molded, thus avoiding the problem of using adhesives or other connectors in traditional assembly ways. This simplified production process not only reduces the production cost, but also improves production efficiency and product quality. In addition, for products that require waterproof and dustproof properties, the lens 11 and the upper shell 10 adopt an integrated molding structure, which can effectively improve the waterproof and dustproof performance of the product. Since there is no gap or connection gap between them, it can effectively prevent harmful substances such as moisture and dust from entering the interior of the product, thereby extending the service life and reliability of the product.

In an embodiment, the upper shell 10 and the lower shell 20 are connected and fixed by ultrasonic welding process. The ultrasonic welding is a fast and efficient connection process that generates energy through high-frequency vibration, causing plastic molecules on a contact surface to rub against each other, generate heat, and melt, thereby achieving a tight connection between the upper shell 10 and the lower shell 20 in a short period of time. This connection way is not only fast, but also ensures the firmness of the connection part, meeting a structural strength requirement of the product. In addition, the ultrasonic welding can form a tight bond between plastic molecules during the connection process due to the effect of vibration energy, effectively preventing the invasion of vapor and moisture. This is particularly important for products that require waterproof and moisture-proof performance. The upper shell 10 and the lower shell 2 connected by ultrasonic welding can ensure a dryness and stability of an internal environment of the product, thereby extending its service life.

Where, the waterproof lamp structure is one section of an eaves lamp or an atmosphere lamp, and a length of the eaves lamp or the atmosphere lamp can be set according to an actual needs, which will not be elaborated here.

The above embodiments are the preferred implementation scheme of the present disclosure. In addition, the present disclosure can also be implemented in other ways, and any obvious replacement is within the protection scope of the present disclosure without departing from the concept of the technical solution.

What is claimed is:

1. A waterproof lamp structure, comprising: an upper shell, a lower shell, and a wire;

the upper shell and the lower shell form an accommodation cavity, which is provided with a PCB lamp board;

two sides of the accommodation cavity are provided with a notch and an installation part extending outward;

the installation part is provided with two transverse elastic strips;

the wire passes through the notch along the installation part and is electrically connected to the PCB lamp board, and the wire abuts against the two transverse elastic strips;

wherein the two transverse elastic strips are circular, triangular or diamond shaped; and the two transverse elastic strips have a height of 0.05 mm-0.3 mm.

2. The waterproof lamp structure according to claim 1, wherein the two transverse elastic strips are integrally formed with the installation part.

3. The waterproof lamp structure according to claim 1, wherein both the upper shell and the lower shell are provided with the notch and the installation part.

4. The waterproof lamp structure according to claim 1, wherein the upper shell is further provided with a lens.

5. The waterproof lamp structure according to claim 4, wherein the lens is hemispherical.

6. The waterproof lamp structure according to claim 5, wherein the lens is convex or concave hemispherical.

7. The waterproof lamp structure according to claim 4, wherein the lens is integrally formed with the upper shell.

* * * * *